United States Patent Office 3,538,343
Patented Nov. 3, 1970

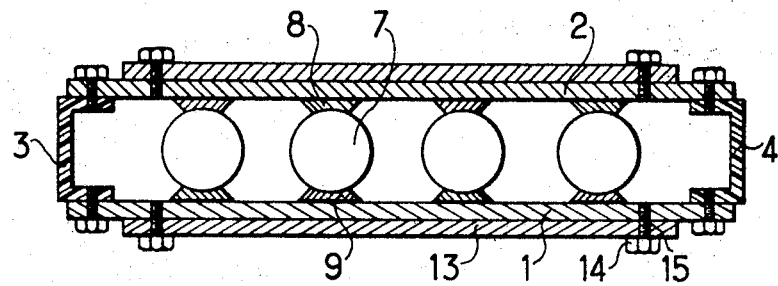
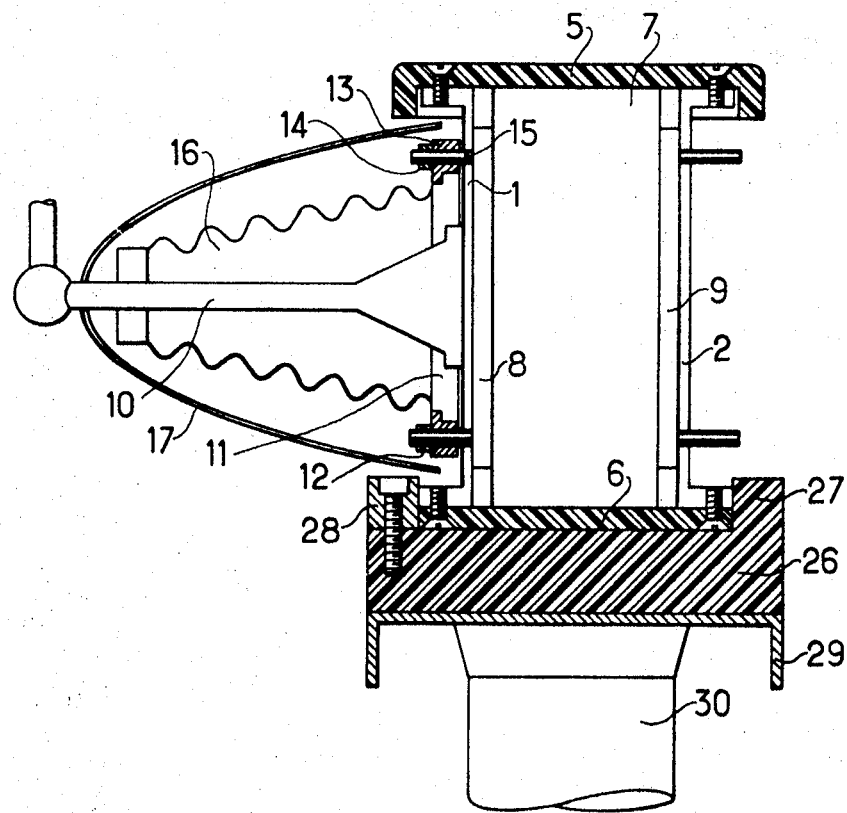

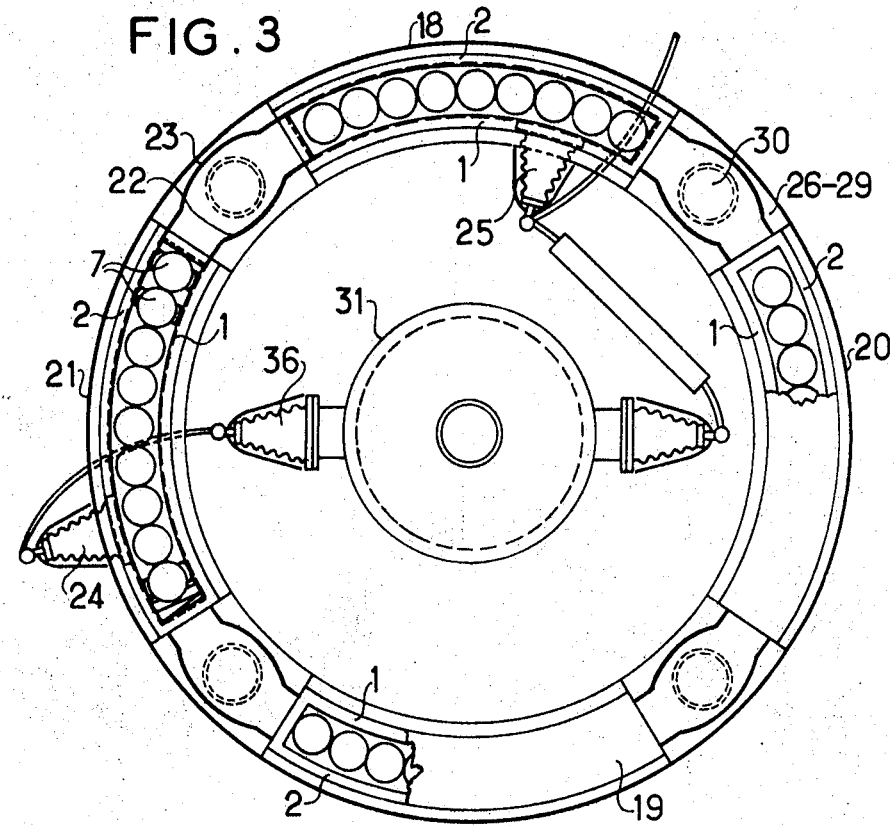
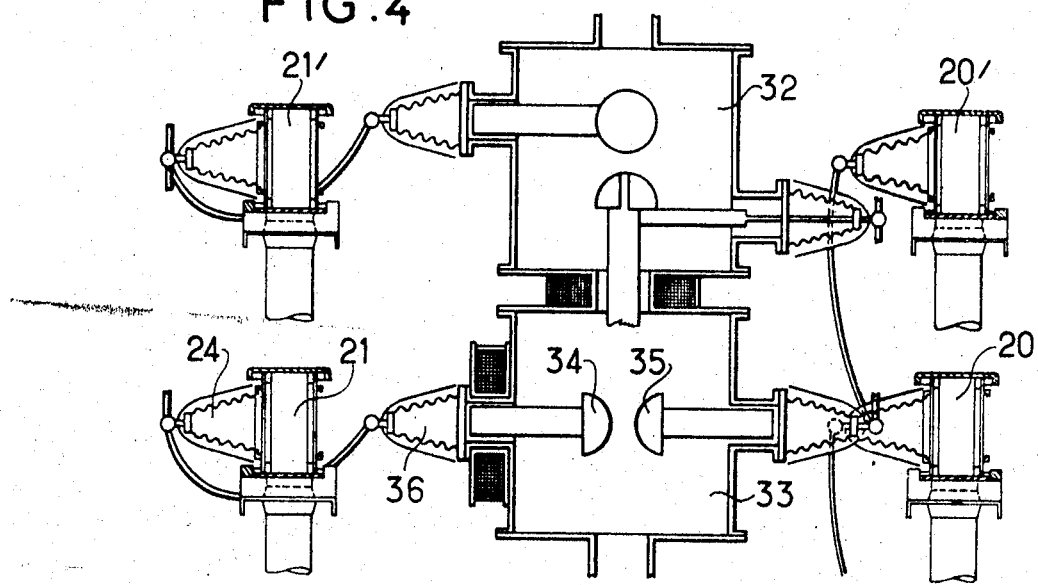

3,538,343
SURGE GENERATOR
Spartacus Barbini, Chaville, France, assignor to Compagnie Generale d'Electricite, Paris, France, a corporation of France
Filed Sept. 19, 1968, Ser. No. 760,853
Claims priority, application France, Sept. 20, 1967, 121,673
Int. Cl. H02m 3/18
U.S. Cl. 307—110                                                11 Claims

ABSTRACT OF THE DISCLOSURE

Bank of capacitors formed by a plurality of capacitor elements, each capacitor element being characterised by the fact that it consists of an assemblage of a plurality of detachable elemental capacitors of substantially cylindrical form, of which electrodes are connected to one or more metal contacts disposed on the outside metal surface of the capacitor substantially on either side of the said capacitor, the said elemental capacitors being disposed with the aid of resilient contacts between two parallel metal plates forming the electrodes of the element, said capacitor elements being also combined to form capacitor rings which may be stacked into columns. A surge generator with a spark gap is placed within a column of a stack of the bank of capacitors.

---

Figure 5:
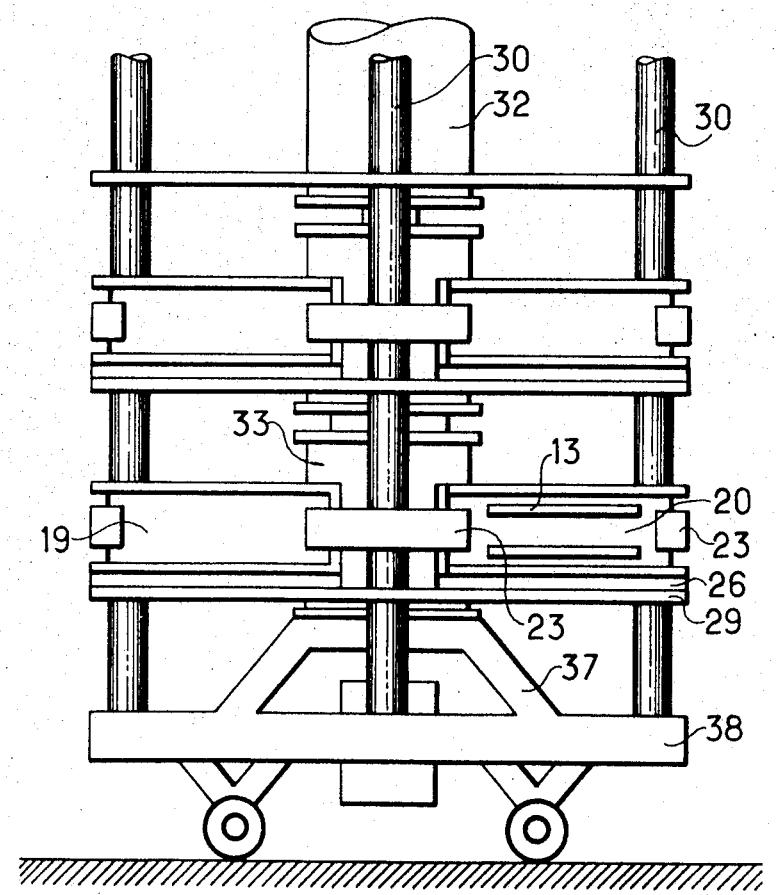

The present invention concerns capacitors and more particularly high-energy capacitors associated with surge generators.

The present invention has for its object to provide an improved capacitor element which may be associated with other elements of the same type to form batteries of capacitors and to form a single capacitor of high capacitance.

The invention also has for its object to provide a capacitor battery construction whose capacity is high and may readily be varied.

Finally, the present invention relates to a surge generator construction comprising a column of spark gaps associated with a battery of capacitors of particular construction.

The element or battery of capacitors according to the present invention is based upon the association of a plurality of elemental capacitors, such as those described and illustrated in applicant's copending U.S. patent application Ser. No. 730,157, filed May 17, 1968, and assigned to the same assignee.

The surge generator comprising a column of spark gaps to which the present invention is applicable may be of any type, but is preferably that described in French Pat. No. 1,491,235, filed by the applicant on Feb. 22, 1966.

The present invention relates to a capacitor element formed of two separate conductive plates maintained in parallel relationship by an insulating base plate and an insulating upper plate forming a cover, and a plurality of elemental capacitors of generally cylindrical form disposed between the said plates, each of the said elemental capacitors being provided with at least two contacts disposed on its outside lateral surface, and the said contacts bearing respectively on the said conductive plates.

In accordance with one embodiment of the invention, at least one of the said conductive plates supports on its external face a pair of slideways to maintain a pressure contact maker, which may thus be readily adjusted in position on the said conductive plate.

In accordance with a particular embodiment, the conductive plates of a capacitor element form a portion of a cylinder, and an annular capacitor is composed of a plurality of these capacitor elements disposed end-to-end.

Each of the capacitor elements comprises insulating walls by which it is closed at its two ends each of these elements preferably forming a fluid-tight compartment which may be filled with a dielectric fluid, for example a gas such as $SF_6$.

In accordance with the present invention, a battery of capacitors is obtained by disposing each of the annular capacitors on a rigid annular support and forming a stack in which two consecutive elemental capacitors are separated by support columns.

In accordance with another aspect of the present invention, such a battery of capacitors is associated with a surge generator comprising a plurality of spark gaps banked in a structure forming a vertical column, this column being coaxial with the said annular capacitors.

Further features and advantages of the present invention will become apparent in the course of the following description, which is given with reference to the accompanying drawings, which illustrate by way of non-limiting illustration a number of practical embodiments, and in which:

FIG. 1 is a section, as seen from above, through a capacitor element according to the invention, FIG. 2 is another view of the element of FIG. 1 in vertical section, FIG. 3 is a view from above, partly in section, of an annular capacitor according to the invention, associated with a surge generator, FIG. 4 is a vertical sectional view of a battery of annular capacitors according to the invention associated with a surge generator, and FIG. 5 is an end view of the said surge generator associated with the said battery of capacitors.

FIG. 1 diagrammatically illustrates in horizontal section a capacitor element according to the present invention, while FIG. 2 is a vertical section of this capacitor element which comprises two conductive metal plates 1 and 2, two insulating terminal walls 3 and 4, an insulating cover 5 and an insulating base 6. The members 1 to 6 form an enclosure in which there are disposed elemental capacitors, such as capacitor 7, which are preferably of generally cylindrical form and which comprise on their lateral surface contacts 8–9 disposed on either side of the body 7 and bearing on the conductive plates 1 and 2. The capacitor element is therefore formed of an assembly of a plurality of elemental capacitors connected in parallel by the plates 1 and 2. The capacitor element may be connected to the circuit in which it is employed by any conventional means.

In accordance with the present invention, this connection will preferably be made above all in the case where the capacitor element is intended to operate at high voltage, by means of detachable terminals comprising a conductive rod 10 whose end is gripped against the plate 1 by a plate 11 maintained by slideways 12–13, which are themselves held fast by nuts 14 screwed on to threaded rods 15, which are welded or secured by any equivalent means to the plates 1 and 2. The rod 10 is surrounded by an insulator 16 and may in addition comprise an "anticorona" hood 17.

The capacitors 7 may be of any type, but in accordance with the invention they will preferably be of the type described in aforementioned application Ser. No. 730,157.

The enclosure surrounding the capacitors need not comprise the terminal walls 3 and 4 if the capacitor element is intended to operate in the ambient atmosphere. Otherwise, the envelope, which is closed on all sides, may be fluid-tight, which permits the use of a vacuum or of dielectric media, such as, for example, $SF_6$ for improving the electrical parameters.

The above-described construction, which is of very simple appearance, makes it possible to solve a number of complex problems concerning the use of high-voltage capacitors of high capacitance.

The construction illustrated in FIGS. 1 and 2 has very great flexibility of use by virtue of the fact that the terminals are detachable and may be placed in any position along the slideways 12–13 by merely loosening the nuts 14 and sliding the terminals in either direction, which makes it possible to reduce the length of the connecting cables. On the other hand, the capacitors which are disposed in the casing may readily be replaced or removed without complex demounting, because an elemental capacitor may be added, removed or replaced simply by unscrewing the cover 5.

In accordance with an embodiment illustrated in FIG. 3, a plurality of capacitor elements similar to those of FIGS. 1 and 2 may be assembled to form an annular capacitor assembly which has very advantageous characteristics in certain applications.

FIG. 3 is a view from above, partly in section, of an annular capacitor which in the particular case considered is formed of 4 capacitor elements 18, 19, 20 and 21, repectively, which are distinguished from those of FIGS. 1 and 2 by the fact that the plates 1 and 2 have an arcuate form substantially similar to a portion of a cylinder.

The inner plate 1 of a capacitor element (for example 18) is connected to the plate 1 of a neighboring element (for example 21) by a conductor 22 which may be a braid, a rod or a metal plate whose ends are either screwed to the plates 1 or in contact by pressure applied by appropriate conventional means. The plates 2 of two consecutive capacitor elements are likewise connected by a detachable conductor 23.

An annular capacitor thus formed also comprises a terminal 24 connected to the plate formed of the plates 2 and the conductors 23, while a terminal 25 is connected to the inner plate formed of the plates 1 and the conductors 22.

In order to enhance the mechanical strength of the whole assembly, the elements 18, 19, 20 and 21 are mounted on a rigid annular insulating plate 26. This plate, which forms a support, is illustrated in section in FIG. 2, and it may comprise a raised rim 27 which is abutted by the external circumference of the base 6 of the capacitor elements, while blocks 28 appropriately secured to the support 26 bears against the internal circumference of the base 6. In order to improve the strength of the whole assembly, and this may be important by reason of the relatively great weight of each of the capacitor elements, the support 26 may comprise a profiled plate 29 consisting of metal, glass fiber or other material having high mechanical strength.

According to the present invention, the annular capacitors, such as that illustrated in FIG. 3, may be stacked one upon the other with the interposition of insulating columns such as 30, bearing on the support 26 preferably in the space between two adjacent capacitor elements and beneath the conductors such as 22 and 23 which interconnect the plates 1 and 2 of the respective elements.

In accordance with another aspect of the present invention, the annular capacitors indicated above are provided in association with a surge generator which is disposed preferably along the axis of the annular arrangement. In French patent application No. 50,635 of Feb. 22, 1966, the applicant has disclosed a surge generator formed of a plurality of generator sections, which may or may not be fluid tight, arranged in a column, each section comprising at least one spark gap formed by electrodes connected to one series of capacitors. A feature of the present invention relates to the combination of the above-described battery of capacitors with such a surge generator.

In FIG. 3 a surge generator 31 is provided in association with an annular capacitor arrangement in accordance with the teachings of the present invention. FIG. 4 is a cross-section of the arrangement of FIG. 3 providing a more detailed arrangement of the surge generator and its interconnection to the capacitor arrangement.

The surge generator comprises a plurality of generator sections such as 32 and 33 stacked in substantially concentric arrangement. Each of the sections comprises a spark gap formed by a pair of electrodes such as 34 and 35, which may be disposed on the one hand in alignment, such as in section 33, and on the other hand transverse to each other, such as in section 32.

Each of the electrodes is connected to a terminal such as 36, which in turn is connected to one of the terminals of the capacitor arrangement such as 24, assuring connection thereof to the plates, such as plates 2, of the annular capacitor arrangement formed by capacitor elements such as 20 and 21. In addition the surge generator includes a release arrangement which has been described in detail in the afore-mentioned French application.

There will be seen in FIG. 5 two modules or generator sections (32 and 33) of the lower part of the surge generator. This surge generator is preferably suspended from a travelling crane, but its lower part is supported by a moving carriage diagrammatically represented by 37–38.

The generator is surrounded by a rigid structure formed of the columns 30 and of the annular supports 29. Disposed on the annular supports 29 are the insulating supports 26, which may be either an annular member or in the form of a number of sectors disposed on the support 29 between the bearing points of the columns 30. Situated on each of the said supports 26 is a capacitor element such as 19–20 (see FIGS. 2 and 3) held in position by the blocks 28. The plates 1 and 2 of the capacitor elements are thereafter electrically connected by conductors such as those denoted by 23. The detachable terminals 10 are then secured to the slideways 13 to permit the making of electrical connections between the various annular capacitors of the construction, the electrodes of the spark gaps of the surge generator and the load and balancing resistors of the capacitors, as cursorily illustrated in FIG. 4.

The construction according to the invention, comprising annular capacitors of pancake form disposed coaxially with the surge generator and stacked one upon the other, affords numerous advantages and more particularly great facility of varying the energy of the apparatus and reduced overall dimensions, it being extremely simple to replace the elemental capacitors (7) by others, and to remove and add capacitors.

At the same time, it is possible to employ only one of the capacitor elements per stage (for example the element 21 by simply removing the conductors 22 and 23, connecting this element to the neighboring elements and connecting the movable terminals 24 and 25 on either side of the element 21).

In order to remove a capacitor element, such as element 21, it is sufficient to withdraw the securing chock 28 and the conductors 22 and 23 connecting this capacitor element to the neighboring elements. In order to demount this element, it is sufficient to withdraw the insulating cover 5, whereby immediate access is obtained to the elemental capacitors 7, which may be instantly withdrawn, because they are only maintained between the plates 1 and 2 by resilient contacts. It is to be noted that these elemental capacitors may be withdrawn or replaced in situ without the chock 28 having to be demounted in order to withdraw the capacitor element.

The overall dimensions of a capacitor element, of the annular capacitor or of the combination of annular capacitors with the surge generator are extremely small as compared with conventional elements or combinations. This is due more particularly to the fact that the construction according to the invention makes it possible to employ fluid-tight capacitor elements filled with dielectric medium of the $SF_6$ type, or any other association of insulating gases, whereby the problems of insulation raised by the use of high voltages are simplified.

The practical applications of the present invention have been described in the foregoing only as illustrative examples having no limiting character. It is obvious that many modifications obvious to the person skilled in the art may be made therein without departing from the scope of the present invention.

More particularly, it is to be noted that the invention is in no way limited by the fact that in the present description reference is made to capacitors and generators described in the earlier patent applications filed by applicant. Although the constructions described in the said earlier applications are particularly suitable for application in accordance with the present invention, other conventional capacitors are suitable for the construction of a capacitor as described in the foregoing and the same is the case with regard to the surge generator.

What is claimed is:

1. A bank of capacitors formed by a plurality of capacitor elements, each capacitor element comprising
   a plurality of detachable elemental capacitors of substantially cylindrical form having resilient contacts substantially on opposite sides thereof, and
   electrodes in the form of first and second parallel metal plates disposed on either side of said elemental capacitors in contact with respective contacts thereon, said metal plates being supported in position by an insulating base and a detachable insulating cover, and two insulating end walls forming with said plates, said base and said cover a closed chamber in which said elemental capacitors are disposed.

2. A bank of capacitors according to claim 1 wherein said chamber is fluid-tight and is filled with a dielectric fluid.

3. A bank of capacitors according to claim 1 wherein at least one of said plates is provided with a pair of slideways and a high-voltage terminal slideably engaging with said slideways.

4. A bank of capacitors according to claim 1 wherein said metal plates are formed accurately as portions of a cylinder.

5. A bank of capacitors according to claim 4 wherein a plurality of capacitor elements are arranged in the form of a ring, said first plates of each capacitor element forming an inside surface of said ring and being electrically connected to each other and said second plates of each capacitor element forming an outside surface of said ring and being electrically connected to each other.

6. A bank of capacitors according to claim 5 wherein the electrical connection between said first and said second metal plates, respectively, is effected by additional metal plates.

7. A bank of capacitors according to claim 5 wherein the electrical connection between said first and said second metal plates, respectively, is effected by a connecting member fitted on to the ends of the capacitor elements.

8. A bank of capacitors according to claim 5 wherein a plurality of rings of capacitor elements are disposed concentrically in a column, one upon the other with an insulating support element disposed between adjacent rings.

9. A bank of capacitors according to claim 8 wherein each of the rings is disposed on a platform formed of a rigid annular plate supported by support elements bearing on a movable carriage.

10. A bank of capacitors according to claim 9 wherein said support elements bear on the surface of the respective rigid annular plates in the space disposed between two successive capacitor elements forming a ring.

11. A bank of capacitors according to claim 8 wherein a surge generator including at least one spark gap formed between opposed electrodes is positioned within said column along the axis thereof with said opposed electrodes being connected to the first and second plates, respectively, of at least one capacitor ring.

References Cited

UNITED STATES PATENTS

| 3,062,974 | 11/1962 | Johnson | 307—108 |
| 3,418,526 | 12/1968 | Simon | 307—110 X |

FOREIGN PATENTS

| 424,407 | 2/1935 | Great Britain. |
| 838,632 | 4/1952 | Germany. |

ELLIOT A. GOLDBERG, Primary Examiner

U.S. Cl. X.R.

317—242, 256